United States Patent
Weiss (10) Patent No.: US 10,492,031 B2
(45) Date of Patent: *Nov. 26, 2019

(54) BIO-POWERED LOCATOR DEVICE

(71) Applicant: Location Labs, Inc., Emeryville, CA (US)

(72) Inventor: Andrew Weiss, San Ramon, CA (US)

(73) Assignee: Location Labs, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/033,643

(22) Filed: Jul. 12, 2018

(65) Prior Publication Data

US 2018/0324554 A1 Nov. 8, 2018

Related U.S. Application Data

(60) Continuation of application No. 14/968,367, filed on Dec. 14, 2015, now Pat. No. 10,028,099, which is a division of application No. 13/647,322, filed on Oct. 8, 2012, now Pat. No. 9,214,077.

(51) Int. Cl.

| | |
|---|---|
| *G01S 19/34* | (2010.01) |
| *H04W 4/02* | (2018.01) |
| *G01S 19/17* | (2010.01) |
| *G08B 21/04* | (2006.01) |
| *H04B 1/3883* | (2015.01) |
| *H04M 1/725* | (2006.01) |

(52) U.S. Cl.
CPC ............. *H04W 4/027* (2013.01); *G01S 19/17* (2013.01); *G01S 19/34* (2013.01); *G08B 21/0446* (2013.01); *H04B 1/3883* (2013.01); *H04M 1/72569* (2013.01); *H04M 1/72572* (2013.01); *G08B 21/0415* (2013.01)

(58) Field of Classification Search
CPC .......... A61N 1/00; C13K 13/00; A46B 13/008
USPC ..................... 442/76; 455/456.2, 41.2, 41.3; 340/539.13, 539.12
See application file for complete search history.

(56) References Cited

U.S. PATENT DOCUMENTS

| | | |
|---|---|---|
| 4,674,199 A | 6/1987 | Lakic |
| 4,845,338 A | 6/1989 | Lakic |
| 5,285,586 A | 2/1994 | Goldston et al. |
| 5,495,682 A | 3/1996 | Chen |
| 6,201,314 B1 | 3/2001 | Landry |
| 6,259,399 B1 | 7/2001 | Krasner |
| 6,571,193 B1 | 5/2003 | Unuma et al. |
| 6,819,258 B1 | 11/2004 | Brown |
| 7,042,338 B1 | 5/2006 | Weber |

(Continued)

OTHER PUBLICATIONS

C. Thompson, J. White, B. Dougherty, A. Albright and D.C. Smith, "Using Smartphones to Detect Car Accidents and Provide Situational Awareness to Emergency Responders" Third International Conference—Mobileware, Jun. 2010.

(Continued)

*Primary Examiner* — Kiet M Doan
(74) *Attorney, Agent, or Firm* — Dovas Law, P.C.

(57) ABSTRACT

A locator assembly is provided. The locator assembly includes an article of wear and a location sending device embedded in the article of wear. A bio-related electric generator is connected to the location sending device for providing power for the location sending device. A system for locating a person and a locating method are also provided.

14 Claims, 7 Drawing Sheets

(56) References Cited

U.S. PATENT DOCUMENTS

| | | | |
|---|---|---|---|
| 7,046,147 | B2 | 5/2006 | Stigall |
| 8,447,279 | B1 | 5/2013 | Peng et al. |
| 8,830,054 | B2 | 9/2014 | Weiss |
| 2002/0120187 | A1 | 8/2002 | Eiffert et al. |
| 2002/0169539 | A1 | 11/2002 | Menard et al. |
| 2004/0030531 | A1 | 2/2004 | Miller et al. |
| 2006/0136393 | A1 | 6/2006 | Abbott et al. |
| 2007/0136102 | A1 | 6/2007 | Rodgers |
| 2008/0139899 | A1 | 6/2008 | Student |
| 2008/0242311 | A1 | 10/2008 | Craine et al. |
| 2008/0319349 | A1* | 12/2008 | Zilberman ............ A61B 5/0031 600/587 |
| 2010/0007503 | A1 | 1/2010 | Carrington |
| 2010/0049095 | A1 | 2/2010 | Bunn |
| 2010/0267361 | A1* | 10/2010 | Sullivan ................ G01S 19/17 455/404.2 |
| 2011/0205051 | A1 | 8/2011 | Katingari |
| 2011/0250904 | A1 | 10/2011 | Valletta et al. |
| 2011/0294457 | A1 | 12/2011 | Braznell |
| 2012/0072340 | A1 | 3/2012 | Amron |
| 2012/0196538 | A1 | 8/2012 | Mateu Codina |
| 2012/0283968 | A1* | 11/2012 | Katsuki ................ A61B 5/1473 702/60 |
| 2012/0289775 | A1 | 11/2012 | Murata |
| 2012/0316456 | A1 | 12/2012 | Rahman et al. |
| 2013/0021788 | A1 | 1/2013 | Mayes |
| 2013/0177006 | A1 | 7/2013 | Baek et al. |
| 2013/0214925 | A1 | 8/2013 | Weiss |
| 2013/0218812 | A1 | 8/2013 | Weiss |
| 2014/0099921 | A1 | 4/2014 | Weiss |
| 2014/0099972 | A1 | 4/2014 | Weiss |
| 2016/0100293 | A1 | 4/2016 | Weiss |

OTHER PUBLICATIONS

Kymisses et al., "Parasitic Power Harvesting in Shoes" Proc. of the Second Intl. Symp. on Wearable Computing, Oct. 1998, p. 132-139.

Clyde Jake Kendall, "Parasitic Power Collection in Shoe Mounted Devices" Tpublished by the Massachusetts Institute of Technology, Department of Physics, 1998.

Hendrich, Ann "Predicting Patient Falls" AJN Nov. 2007 vol. 107, No. 11 [Online] Downloaded Oct. 16, 2014.

Office Action dated Mar. 19, 2015 for U.S. Appl. No. 13/647,322.

Office Action dated May 28, 2014 for U.S. Appl. No. 13/647,322.

Office Action dated Oct. 1, 2014 for U.S. Appl. No. 13/647,322.

Kim, Kyu-jin et al "Dementia Wandering Detection and Activity Recognition Algorithm Using Tri-axial Accelerometer Sensors" IEEE 2009 [Online] Downloaded Feb. 1, 2016 http://ieeexplore.ieee.org/xpls/abs_all.jsp?arnumber=5405672&tag=1.

Office Action dated Apr. 25, 2017 for U.S. Appl. No. 14/968,367.

Office Action dated Oct. 17, 2017 for U.S. Appl. No. 14/968,367.

Rifkin, Ryan and Aldebaro Klautau "In Defense of One-Vs-All Classification" The Journal of Machine Learning Research 2004 [Online] Downloaded Oct. 16, 2014.

Doukas, Charalampos et al "Patient Fall Detection using Support Vector Machines" 2007 international Federation for Information Processing, vol. 247 [Online] Downloaded Oct. 16, 2014.

Glick, henry "Introduction to Markov MOdels" Jul. 2007 [Online] Downloaded Oct. 16, 2014.

U.S. Appl. No. 61/572,789 dated Jul. 19, 2011.

\* cited by examiner

BIO-POWERED LOCATOR DEVICE

CROSS REFERENCE TO RELATED APPLICATION(S)

This application is a continuation of U.S. patent application Ser. No. 14/968,367, filed Dec. 14, 2015, which is a division of U.S. patent application Ser. No. 13/647,322, filed Oct. 8, 2012, now U.S. Pat. No. 9,214,077, which applications are incorporated by reference as if fully set forth.

BACKGROUND

There exist a number of different methods capable of tracking and locating individuals, for example using cellular phones, which operate by switching cell towers as an individual moves. By triangulating cell towers, the position of an individual can be determined with a high degree of accuracy. More accurate locations can be obtained by using Global Positioning System GPS tracking. A modern GPS tracking device can track a person, a vehicle, or another moving object and, when needed, determine the position of the device with high accuracy.

While modern tracking devices are small, low cost, and accurate, they are not used to the full extent of their capabilities. For example, there are a number of groups of people whose location may be very important, but who are not fully capable of fulfilling the responsibilities of carrying and using location tracking devices. For example, small or forgetful children, the autistic, mentally or physically challenged individuals, the elderly, the emotionally disturbed, those under heavy medication, those with Alzheimer's and other forms of dementia, and those that for other reason cannot be relied upon to carry location tracking devices. Further, it would also be desirable to predict the activity in which an individual is engaged.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A locator assembly is provided. The locator assembly includes an article of wear and a location sending device embedded in the article of wear. A bio-related electric generator is connected to the location sending device for providing power for the location sending device.

The locator assembly can be a battery powered locator assembly for locating a person. The assembly can include a location sending device embedded in an article of wear wherein the battery is recharged by a bio-related electric generator. The locator assembly can automatically transmit the location of the wearer when the wearer is outside of an allowed area, or upon reception of a location request from another person. In addition, the locator assembly can transmit accelerometer information to enable insight into what is being done at the location.

The location sending device can incorporate GPS and cell technology. The bio-related electric generator can include a bio-mechanical electric generator, a bio-chemical electric generator, or other type of wear-related electric source. The article of wear can include a shoe, an underwear waistband, a piece of jewelry such as a necklace, or other article of wear. The locator assembly can automatically send out location information such as when the wearer is outside of an allowed area, or responsive to a location request from another party.

Further provided is a system for locating a person including an article of wear, a computerized location sending device embedded in the article of wear, at least one battery for powering the location sending device, and a bio-related electric generator for recharging the at least one battery. The system further includes a service operator in communication with the location sending device and a location requesting device in communication with the service operator. When the location requesting device contacts the service operator, the service operator obtains the location of the location sending device and sends that location to the location requesting device. The location sending device can include an accelerometer, in which case motion information can also be transmitted to the location requesting device.

In one example, the article of wear is a shoe, and the location sending device is a GPS equipped cellular communication device. A bio-mechanical electric generator and at least one battery are embedded in the shoe. The system can include a battery charger disposed between the at least one battery and the bio-mechanical electric generator, and the service operator provides cellular communications over a plurality of base stations (e.g. cell phone towers).

A method of locating an individual is provided including embedding a computerized location sending device having at least one battery and a bio-related electric generator in an article of wear, and enabling a user to wear the article of wear. The at least one battery is recharged by the bio-related electric generator, and the location of the user is sent using the location sending device. In one example method the location is sent automatically when a user is outside of an allowed area. In another example method the location is sent responsive to receipt of a location request from a location requesting device.

A location sending device is provided which includes an accelerometer that senses the motion of a wearer of the location sending device. Such motion information enables for example a determination that the wearer is walking, standing still, or riding in a vehicle.

A user data acquisition assembly is provided including an article of wear, a user data sending device comprising at least one of a location determining device and an acceleration determining device embedded in the article of wear, and a bio-related electric generator connected to the user data sending device for providing power for the user data sending device.

A system for determining a user motion state is provided. The system includes a user data acquisition assembly including an article of wear, a user data sending device comprising an acceleration determining device embedded in the article of wear, at least one battery connected to the user data sending device for powering the user data sending device, and a bio-related electric generator connected to the at least one battery for recharging the at least one battery. The system further includes a service operator in communication with the user data sending device and a user data requesting device in communication with the service operator. The service operator is configured to obtain user data from the user data sending device and provides the user data to the user data requesting device.

A method of determining and sending a user motion state is provided. The method includes providing a data acquisition device comprising a user data sending device including an acceleration determining device, and a bio-related electric generator connected to the user data sending device. The data acquisition device is embedded in an article of wear. A user is enabled to wear the article of wear. A classifier is used to determine a user motion state of a user wearing the article of wear based on the data from the acceleration determining device, and the user motion state is sent out via a network.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

DETAILED DESCRIPTION OF ILLUSTRATIVE EMBODIMENT(S)

Embodiments are described below with reference to the drawing figures in which like numerals represent like elements throughout.

Additionally, the terms "a" and "an" as used herein do not denote a limitation of quantity, but rather denote the presence of at least one of the referenced items.

What follows are descriptions of locator assemblies having embedded location tracking devices incorporating bio-related electric generation to charge one or more batteries that power the locator assemblies. The locator assemblies can include acceleration determination devices (e.g. accelerometers) and motion classifiers used to classify acceleration and/or location data to determine a user motion state. Such locator assemblies are useful for tracking persons. Bio-related electric generation can be enabled by bio-mechanical electric generators, bio-chemical electric generators, and any other type of electric generator powered by the motion, chemical composition, or thermal generation of living organisms. In one exemplary application, a caretaker needs to determine the location of a mentally challenged individual. The caretaker embeds a location tracking device in that individual's underwear waistband. When the caretaker needs to locate the mentally challenged individual, the caretaker sends a location request to determine the location of the mentally challenged individual from a requesting device, such as a computer or a cell phone, to a locator system. The locator system forwards the location request to the location tracking device. The location tracking device determines its location and sends that location back to the locator system which then forwards it to the caretaker. A bio-related electric generator, which may operate by converting body sugars to electricity, by bio-mechanical motion, or by other bio-related technology, keeps a battery charged which powers the device.

In another exemplary application, the foregoing caretaker places a necklace including an embedded location tracking device around the neck of the individual.

In another exemplary application a parent establishes a "geofence" around an area in which a child is permitted, a geofence being the border of a geographical area that the child is allowed to roam in. The parent requests automatic notification when the child passes through the geofence. A typical geofence might be for example 200 feet from the parent, 25 yards from a house, or other definable geographic area. A parent has obtained a locator assembly including shoes, or one shoe, that include a location tracking device. When the child wears the shoes and walks, runs, or plays, his bio-mechanical action charges a battery that powers the locator assembly and its location tracking device. The locator assembly tracks the child, determines when that child is outside of the geofence, and automatically signals the parent via a cell phone or other communication device that the child is outside of the geofence.

In another exemplary application, a caretaker monitors a state of motion of a user ("user motion state") who wears a user data acquisition assembly in the form of an article of wear. Using a motion classifier, acceleration data from the data acquisition assembly is used to determine the user motion state. The monitored user may be classified as walking, immobile, having fallen, in a motor vehicle or other determinable user motion state. This can be useful for example to determine if a child has been inappropriately picked up in a motor vehicle. Location data can be compared or combined with the motion classification to determine the appropriateness of a determined user motion state at a particular location. For example, a determination that the monitored user is both not mobile and located in a vehicle parking area can trigger an alert to the caretaker based on the logic that being immobile in a vehicle parking lot may be indicative of an emergency situation.

Figure 1:
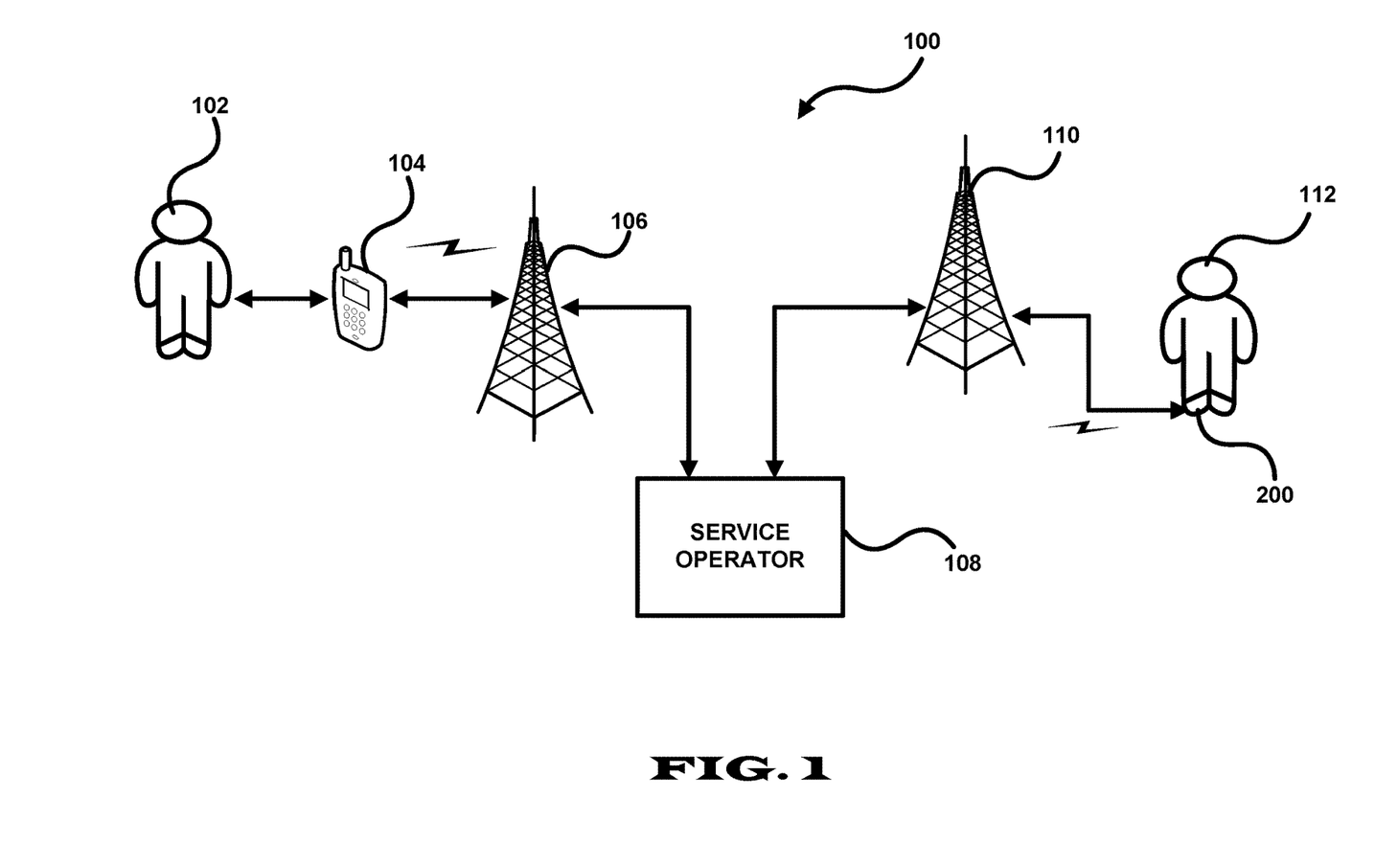
FIG. 1 is a depiction of a prototypical context in which one or more disclosed embodiments may be implemented.

FIG. 1 depicts a prototypical context 100 in which one or more disclosed embodiments may be implemented. As shown, the context 100 includes a locator user 102 with a location requesting device, which in context 100 is a cell phone 104. The cell phone 104 is in cellular communications with a base station 106 (e.g. cell phone tower) that is part of a location system, which in the context 100 is a cellular service operator 108. The context 100 further includes a tracked person 112. The tracked person 112 is wearing a locator assembly, which in context 100 takes the form of a shoe 200. The shoe 200 includes a battery powered, computerized, GPS enabled, accelerometer augmented, embedded location tracking device. The embedded location tracking device further includes a bio-related electric generator which in the context 100 takes the form of a bio-mechanical electric generator described in more detail below with reference to FIG. 2. The shoe 200 is in cellular communications with a base station 110 enabled by the cellular service operator 108.

Cellular service operators 108 provide communication services and a range of other services to their users. In particular, the cellular service operator 108 supports GPS location finding as well as the capability of handling other forms of data, such as motion information from an accelerometer.

Figure 2:
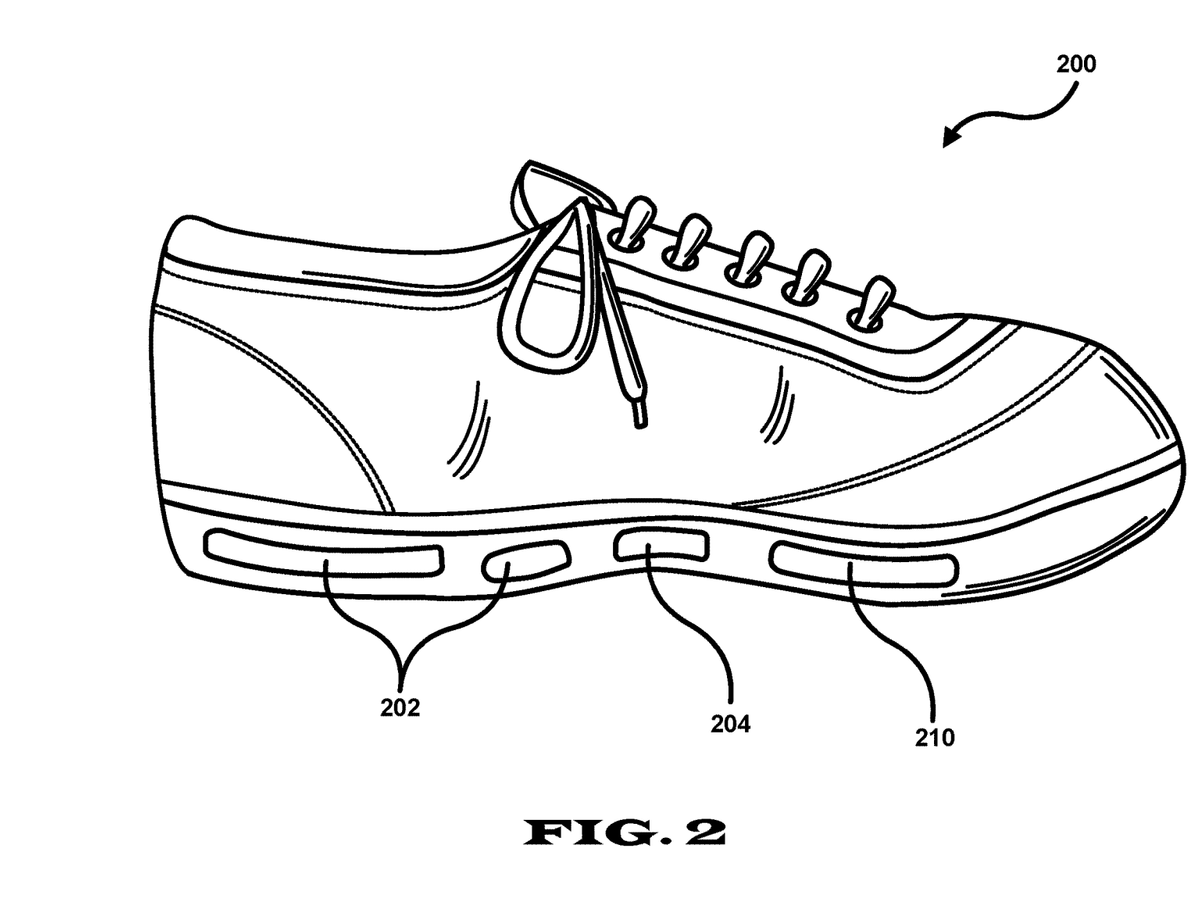
FIG. 2 is an elevation view of a shoe.

FIG. 2 illustrates the locator assembly shoe 200 in more detail. The locator assembly shoe 200 includes a plurality of batteries 202 that power a computerized, GPS equipped, accelerometer augmented cellular communication device ("GPS equipped cell device") 204 that is configured to automatically respond with the current location from the GPS system and with the current motion information from the accelerometer when an incoming call or data transmission request is received. The GPS equipped cell device 204 is in communication with the base station 110. See FIG. 1. Application software for controlling the GPS equipped cell device 204 to send location and accelerometer information is readily available. Furthermore, specialized applications needed to optimize the GPS equipped cell device 204 are readily developed using widely available software and mobile application development systems.

A problem addressed herein is providing long term operating power for the GPS equipped cell device 204 by automatically recharging the batteries 202. Battery recharging is accomplished using a bio-mechanical electric generator 210 that is embedded in the locator assembly shoe 200. The bio-mechanical electric generator 210 generates electrical power when the tracked person 112 walks, runs, or performs other motion. Other types of bio-related electric generators can be used in place of the bio-mechanical electric generator 210, for example a chemical electric generator that operates by converting a user's body sugars to electricity, or a thermally activated electric generator that operates from a user's body's heat differentials.

Figure 3:
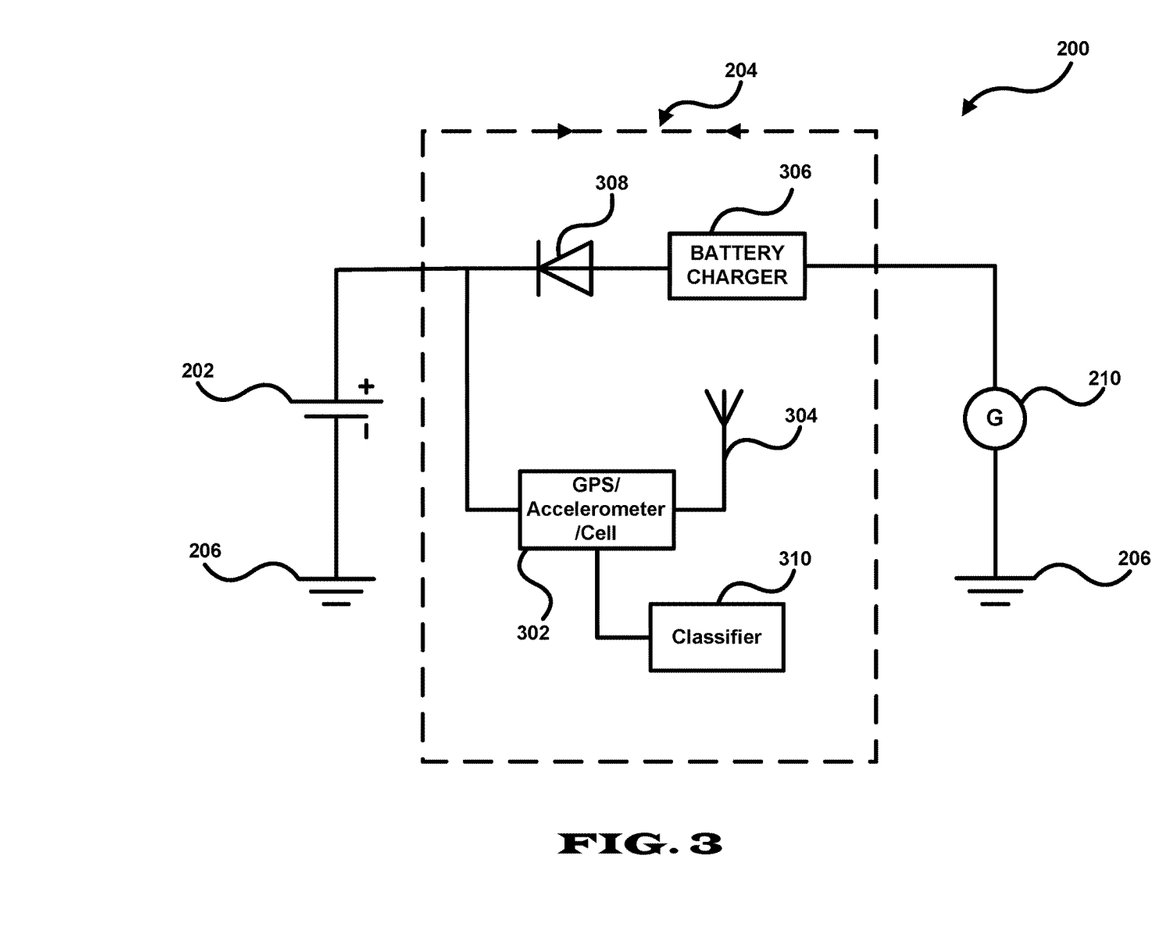
FIG. 3 is a schematic depiction of the shoe of FIG. 2.

FIG. 3 provides a schematic depiction of the electrical components of the locator assembly shoe 200. The bio-mechanical electric generator 210 applies its energy into a battery charger 306 located within the GPS equipped cell device 204. The battery charger 306 regulates and smoothes the relatively pulsed and/or choppy output from the bio-mechanical electric generator 210. The output of the battery charger 306 is shown passing through an isolation diode 308 which isolates the battery charger 306 and bio-mechanical electric generator 210 from the rest of the system. Depending on the battery charger 306, an isolation diode 308 will not be required as the battery charger 306 output may implement isolation.

The regulated output from the battery charger 306 is applied to the batteries 202. The regulated output charges the batteries 202 as the user, the tracked person 112 moves. The batteries 202 provide operating power to the GPS equipped cell device 204, specifically including a GPS/accelerometer/cell transceiver 302. The GPS/accelerometer/cell transceiver 302 receives and sends signals via an antenna 304.

A classifier 310 can access acceleration data from an accelerometer of the GPS/accelerometer/cell transceiver 302 to determine a user motion state. The classifier 310 is powered by the batteries 202. The user motion state can include a determination that the user is walking, is in a moving vehicle, is immobile, or has fallen. The classifier 310 can further receive location information from the GPS of the GPS/accelerometer/cell transceiver 302 for use in determining the user motion state or use in determining whether an alert is sent out by the GPS/accelerometer/cell transceiver 302. For example a user's location is important for determining whether the user's immobility is indicative of an emergency situation. The classifier can alternatively be provided remotely, for example provided by the service operator 108 or other remote network accessible system.

The foregoing has described a locator assembly shoe 200 having a GPS and accelerometer equipped cell device that operates on batteries that are recharged by a bio-mechanical electric generator. In other embodiments, other types of location sensing devices, such as RFID-triangulation systems can be used instead of GPS equipped cell devices. Furthermore, an accelerometer is not required. In an alternative embodiment, an accelerometer and motion classifier is present, and a GPS or other location determining device is not present.

While the embodiment illustrated in FIGS. 1-3 is described as sending out location and motion information upon request, for example a request from a caretaker. Alternatively, the location tracking device automatically sends out the location and/or motion information when the user/wearer is outside of an allowed area or responsive to other transition determined from collected location data or acceleration data.

The user motion state can be sent out by the GPS equipped cell device 204 if the user motion state is determined by the classifier 310. User motion state can be sent out responsive to a request from a caretaker or other party or responsive to a transition to a new user motion state from a prior in time user motion state. If the user motion state is determined by the service operator 108 or other network accessible system, the GPS equipped cell device 204 sends out acceleration data, and location data if necessary, to such system to enable determination of the user motion state.

Figure 4:
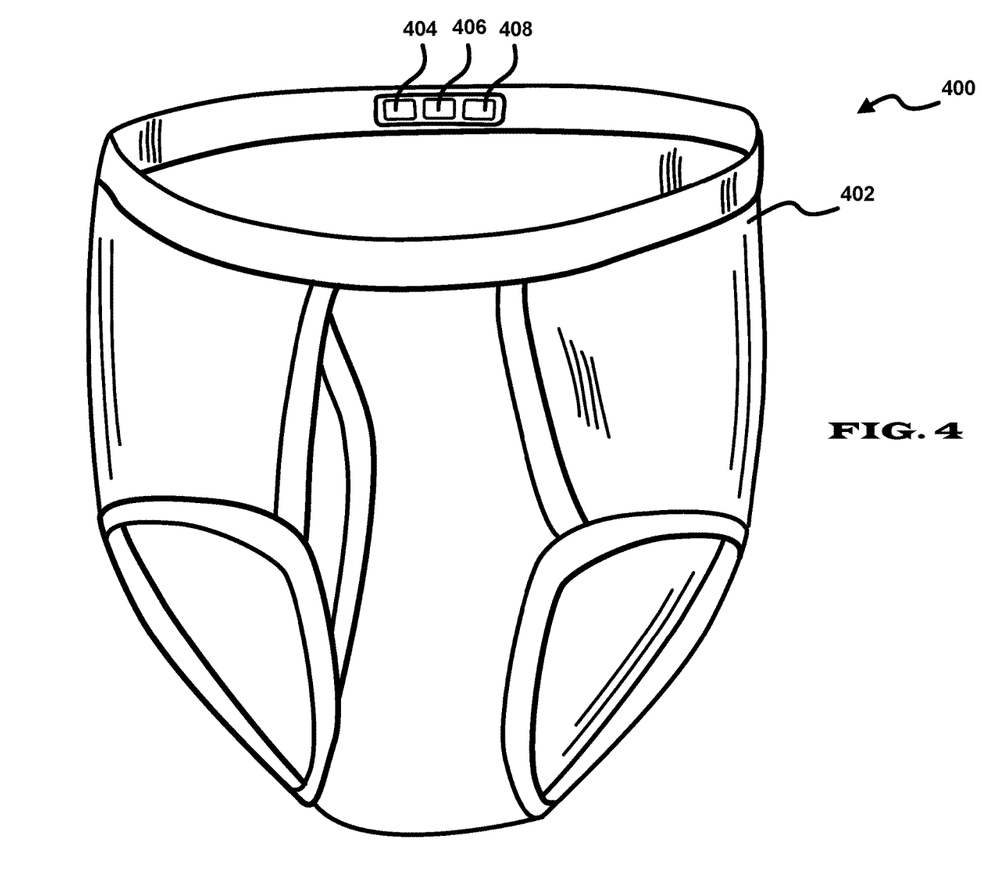
FIG. 4 depicts a locator assembly and its article of wear.

The location tracking device is not limited to use with shoes. The location tracking device can be used with a wide range of articles of wear, including pants, shirts, shoes, underwear, bras, socks, panties, blouses, skirts, sweaters, jackets, coats, hats, dresses, helmets, and blazers. For example, FIG. 4 illustrates a locator assembly 400 in the form of underwear 402 having an embedded locator device that includes a GPS/accelerometer/cell transceiver 408, a battery 406 for powering the GPS/accelerometer/cell transceiver 408, and a bio-related electric generator 404 for recharging the battery 406. The bio-related electric generators can include for example a bio-mechanical electric generator, a chemical electric generator that operates by converting a user's body sugars to electricity, or a thermally activated electric generator that operates from a user's body's heat differentials. In another embodiment the location tracking device can be surgically implanted in the body of a user.

Figure 6:
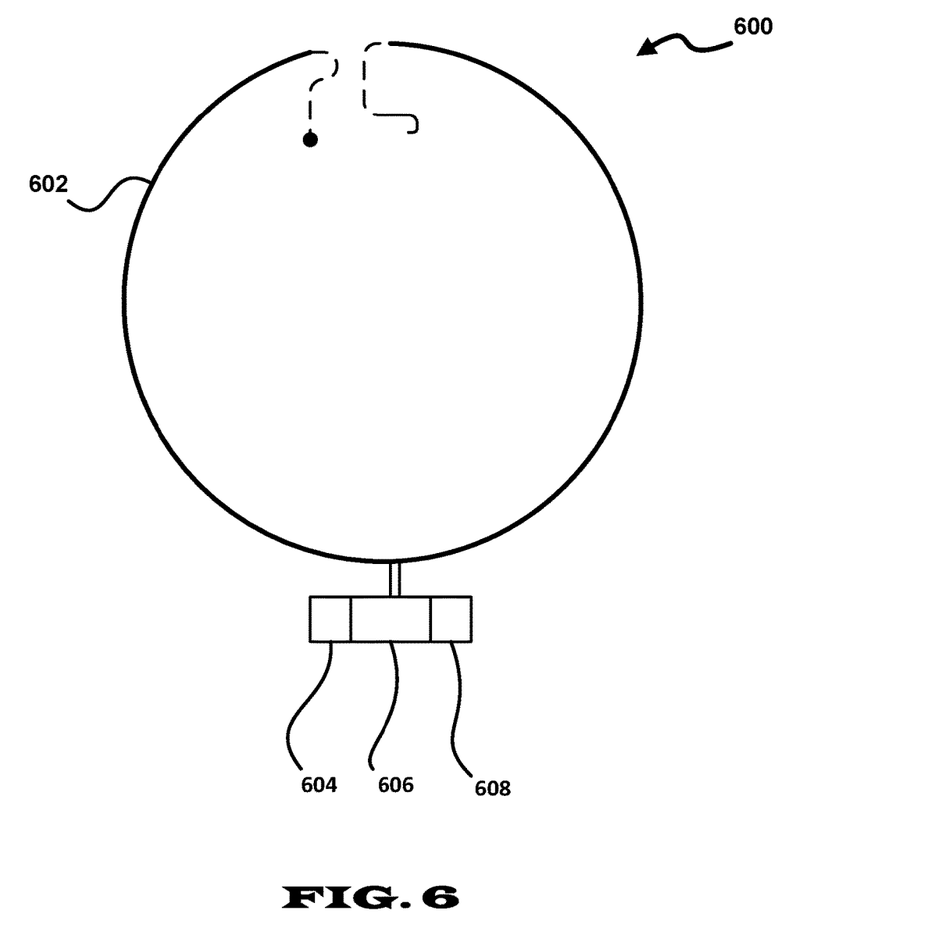
FIG. 6 illustrates a location sending device embedded in a necklace.

Articles of wear should be understood as including things other than clothing. FIG. 6 illustrates a locator assembly 600 in the form of a necklace 602 having a locator device that includes a GPS/accelerometer/cell transceiver 606, a battery 608 for powering the GPS/accelerometer/cell transceiver 606, and a bio-related electric generator 604 for recharging the battery 608. Other articles of wear such as watches can also incorporate such locator device, particularly when the watches include bio-related generators driven by self-winding watch mechanisms.

Figure 5:
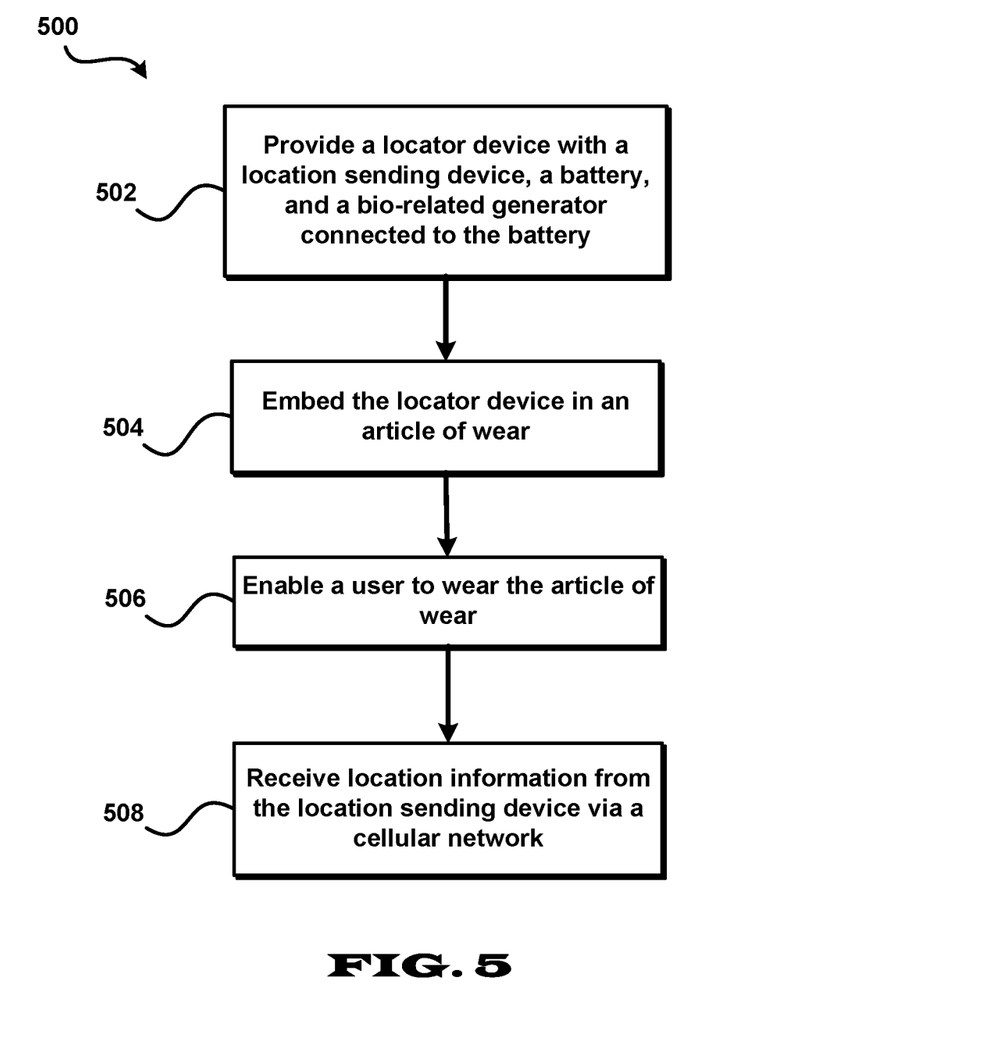
FIG. 5 is diagram showing a method of locating an individual using a locator assembly.

FIG. 5 illustrates a method 500 of locating an individual. The method 500 includes a step 502 of providing a locator device that includes a location sending device, for example the GPS/accelerometer/cell transceiver 408 shown in FIG. 4, at least one battery, for example the battery 406, that is connected to the location sending device and that supplies operating power, and a bio-related electric generator, for example the bio-related electric generator 404, that is connected to the at least one battery and is used for recharging the battery.

The method 500 further includes embedding the locator device in an article of wear (step 504), enabling a user to wear the article of wear (step 506), and receiving location information from the location sending device via a cellular network (step 508). The method can further include receiving motion information such as acceleration information from an accelerometer of the locator device.

Figure 7:
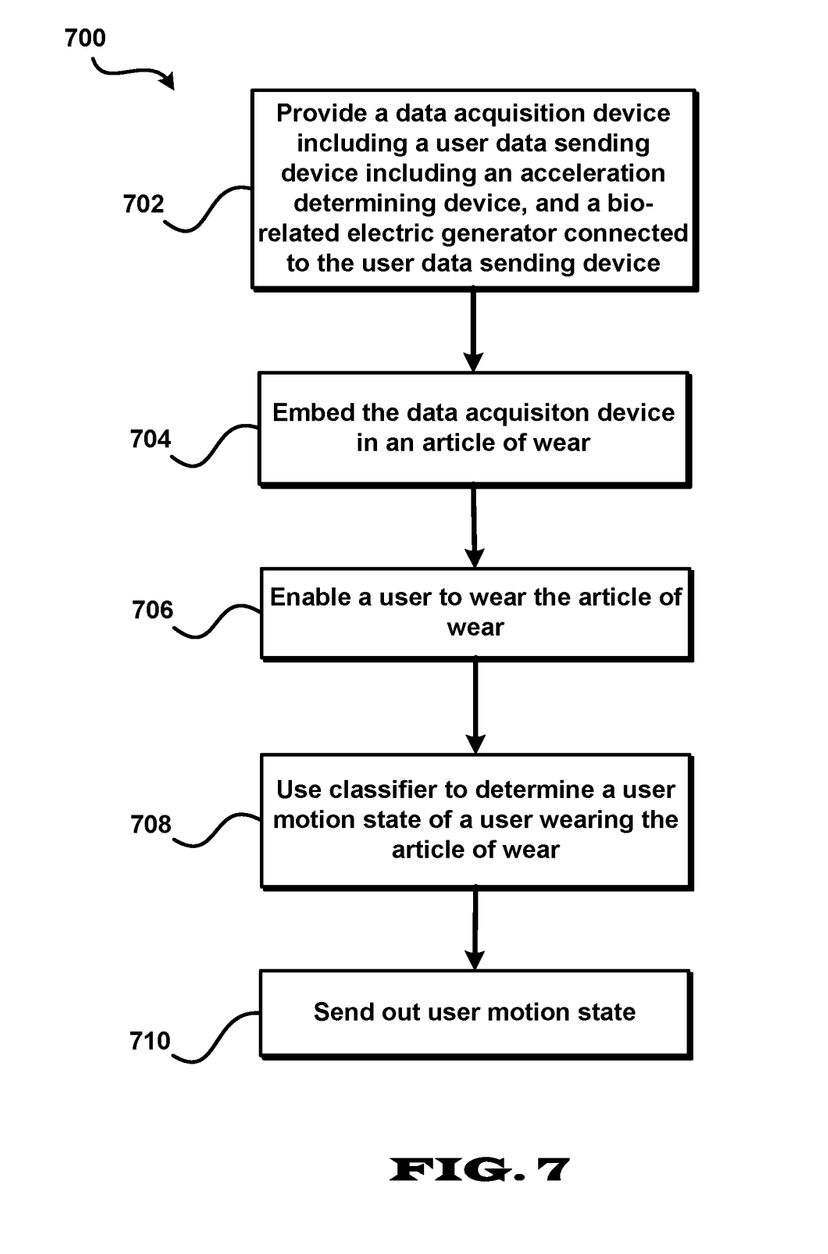
FIG. 7 is a diagram showing a method of determining and sending a user motion state.

FIG. 7 illustrates a method 700 of determining and sending a user motion state. The method 700 includes providing a data acquisition device comprising a user data sending device including an acceleration determining device, and a bio-related electric generator connected to the user data sending device (step 702). The data acquisition device is embedded in an article of wear (step 704). The user is enabled to wear the article of wear (step 706). A classifier is used to determine a user motion state of a user wearing the article of wear based on the data from the acceleration determining device (step 708), and the user motion state is sent out via a network (step 710).

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A method of locating an individual, comprising the steps of:
    providing a location sending device including a location determining device, an accelerometer, at least one battery, and a bio-related electric generator for recharging the at least one battery;
    embedding the location sending device, including the location determining device, the accelerometer, the at least one battery, and the bio-related electric generator, in an elastic band of an article of clothing comprising at least one of pants, underwear, or a shirt;
    determining by the location sending device a transition to a new user motion state from a prior user motion state based at least on data from the accelerometer and data from the location determining device;
    sending by the location sending device out the new user motion state responsive to the transition; and
    receiving by a network-connected computing system location information and the new user motion state from the location sending device via a network.

2. The method according to claim 1, further comprising sending location information from the location sending device when a user wearing the article of clothing is outside of an allowed area and responsive to the transition.

3. The method according to claim 1, further comprising sending location information from the location sending device responsive to the transition and a request from a location requesting device.

4. The method according to claim 1, further comprising sending out location data responsive to the transition.

5. The method according to claim 1, wherein the bio-related electric generator comprises a chemical electric generator.

6. The method according to claim 1, wherein the bio-related electric generator comprises a bio-mechanical electric generator.

7. The method of claim 1, further comprising:
    applying a classifier to the data from the accelerometer and the data from the location determining device to determine the new user motion state.

8. The method of claim 7, wherein applying the classifier to determine the new user motion state comprises determining that a user wearing the article of clothing has fallen based on the data from the accelerometer and the data from the location determining device.

9. The method of claim 7, wherein applying the classifier to determine the new user motion state comprises determining that a user wearing the article of clothing is immobile based on the data from the accelerometer and the data from the location determining device.

10. The method of claim 7, wherein applying the classifier to determine the new user motion state comprises determining that a user wearing the article of clothing is walking based on the data from the accelerometer and the data from the location determining device.

11. The method of claim 1, further comprising:
    receiving by the network-connected computing system a request by a location requesting device for the new user motion state; and
    sending by the network-connected computing system the new user motion state to the location requesting device.

12. A locator device comprising:
    a computerized location sending device comprising a location determining device and an accelerometer, the location sending device configured to determine a transition to a new user motion state from a prior user motion state using a classifier based at least on data from the accelerometer and data from the location determining device, and configured to send out the new user motion state responsive to the transition;
    at least one battery connected to the location sending device for powering the location sending device; and
    a chemical electric generator connected to the at least one battery for recharging the at least one battery;
    wherein the location sending device, the at least one battery, and the chemical electric generator are embedded in an elastic band of an article of clothing comprising at least one of pants, underwear, or a shirt.

13. The locator device according to claim 12, wherein the location sending device is further configured to send out location data responsive to the transition.

14. The locator device of claim 12, wherein the chemical electric generator is configured to convert body sugar to electricity.

* * * * *